United States Patent [19]
Akins

[11] Patent Number: 5,359,620
[45] Date of Patent: Oct. 25, 1994

[54] APPARATUS FOR, AND METHOD OF, MAINTAINING A CLEAN WINDOW IN A LASER

[75] Inventor: Robert P. Akins, Escondido, Calif.

[73] Assignee: Cymer Laser Technologies, San Diego, Calif.

[21] Appl. No.: 975,385

[22] Filed: Nov. 12, 1992

[51] Int. Cl.⁵ .................................................. H01S 3/22
[52] U.S. Cl. ......................................... 372/58; 372/98
[58] Field of Search ...................................... 372/55–60, 372/98, 103, 104

[56] References Cited

U.S. PATENT DOCUMENTS

| | | | |
|---|---|---|---|
| 4,534,034 | 8/1985 | Hohla et al. | 372/59 |
| 4,611,327 | 9/1986 | Clark et al. | 372/58 |
| 4,737,963 | 4/1988 | Koseki | 372/58 |
| 4,959,840 | 9/1990 | Akins et al. | 372/57 |
| 4,991,180 | 2/1991 | Yamaguchi et al. | 372/56 |
| 5,197,078 | 3/1993 | Terada et al. | 372/55 |

Primary Examiner—John D. Lee
Attorney, Agent, or Firm—Ellsworth R. Roston; Charles H. Schwartz

[57] ABSTRACT

A first gas in a laser cavity is ionized by an electrical discharge in the cavity as a step in producing an energy radiation. Debris (particulates) is produced during the formation of the energy radiation. The radiation and the debris move toward an optical element in the cavity. The optical element may be a window or a mirror. The debris tends to deposit everywhere in the cavity, including on the optical element, thereby dirtying the optical element. This inhibits the efficiency in the laser operation. A clean gas is directed into the cavity through a passage at a position displaced from the optical element. The clean gas then passes in the cavity through an orifice further from the optical element than the passage. The flow of the first gas through the orifice creates a venturi effect on the clean gas to insure that the clean gas will move away from the optical element. In this way, the clean gas inhibits the first gas and the debris from moving to the optical element. Baffles in the cavity between the passage and the orifice provide irregularities in the movement of the first gas from the orifice to the optical element, thereby further inhibiting the movement of the debris to the optical element. Baffles in the cavity between the passage and the optical element also inhibit the movement of any gas to the optical element. An electrically grounded screen in the displaced passage attracts any ions present in the clean gas.

32 Claims, 1 Drawing Sheet

U.S. Patent    Oct. 25, 1994    5,359,620
FIG. 1 PRIOR ART
FIG. 4
FIG. 3
FIG. 2 PRIOR ART
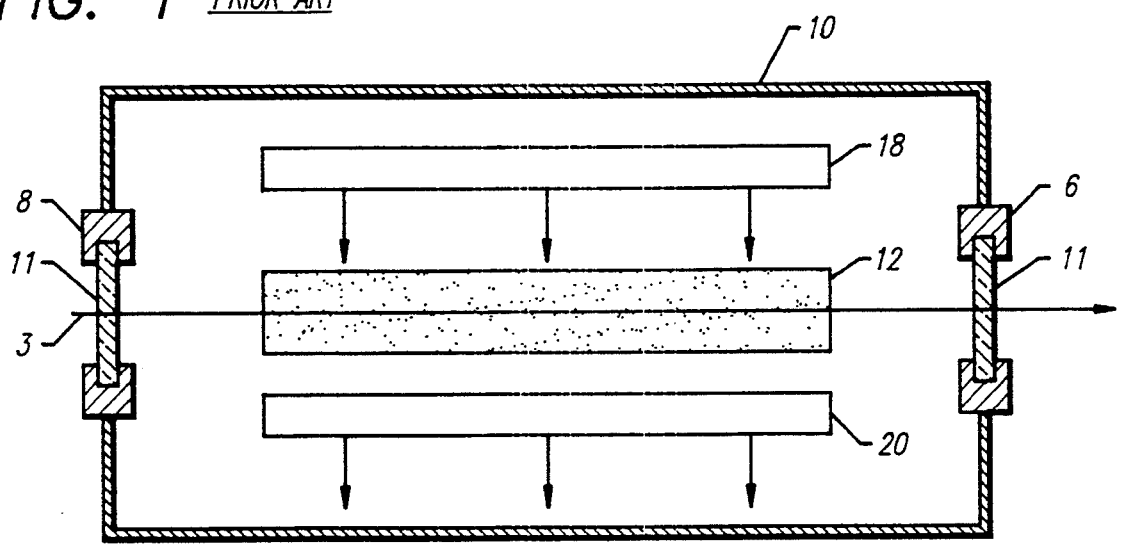
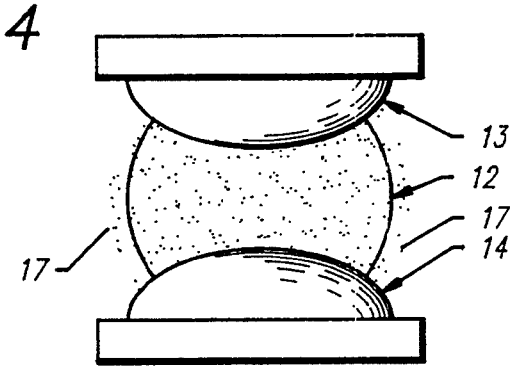
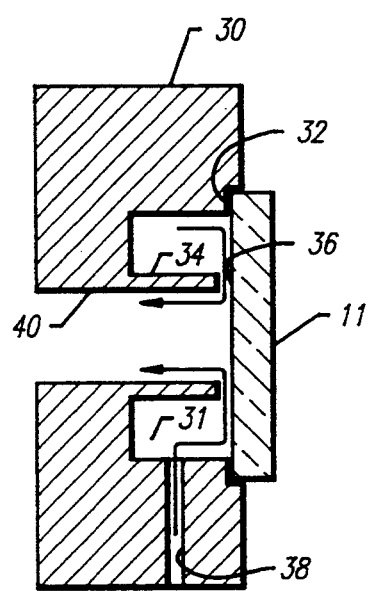
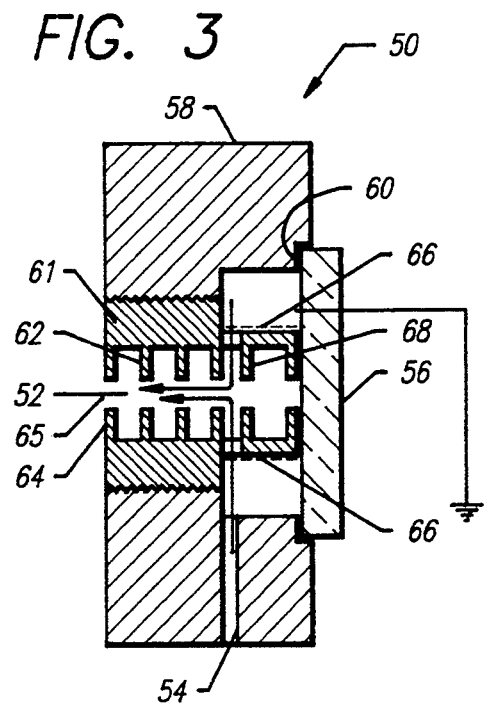

APPARATUS FOR, AND METHOD OF, MAINTAINING A CLEAN WINDOW IN A LASER

This invention relates to apparatus for, and a method of, maintaining a clean optical element in a laser. The optical element may be a window or a mirror.

Lasers are used for many different applications. The lasers are advantageous because they provide energy radiation at a particular wavelength. This energy radiation is advantageous because it can be produced with considerably greater directionality than can be produced by sources of other radiation. For example, lasers have been used advantageously in a wide variety of different applications including medical applications for providing focussed energy of a high magnitude to fuse different elements in the eye such as to repair detached retinues and torn retinues in a patient's eye. Lasers have also been used in the manufacture of integrated circuit chips. Lasers have also been used to test the efficiency of splices of optical fibers.

Lasers may employ optical elements at opposite ends of the cavity. The optical elements may constitute mirrors or windows. When the optical elements constitute windows, a mirror outside the window at one end generally reflects all of the radiation and a mirror outside the window at the other end reflects most of the radiation and passes some of the radiation. Alternately, windows may be provided at the ends of the cavity and the windows may be coated with a material to make them partially or totally reflective. In this way, the radiation produced in the cavity may be amplified in successive reflections by the mirrors while a portion of the radiation passes through one of the windows in each cycle of such reflections. The radiation passing through such optical element is used in applications such as described in the previous paragraph.

Some types of lasers employ chemical elements which react when an electrical discharge is produced in the laser. For example, hydrogen and chlorine may be reacted to produce hydrogen chloride when an electrical discharge occurs in the laser, or krypton and fluorine may be reacted to produce krypton fluoride when the electrical discharge occurs. Such a chemical reaction causes a large amount of energy to be generated at a particular wavelength dependent upon the characteristics of the gases.

Lasers employing electrical discharges may have certain disadvantages. One disadvantage is that erosion of the electrodes can cause undesirable particles to be produced. These particles may be considered to constitute debris. The debris tends to migrate to the optical element and cloud the optical element. When the optical element becomes clouded, the efficiency in the operation of the laser becomes degraded.

A knowledge of the problem discussed in the previous paragraph has existed for some time. Attempts have been made in the prior art to resolve this problem. For example, gas from another source has been directed against and past the surface of the optical element to inhibit the debris from reaching the optical element. Such a system is disclosed in Japanese Kokoku patent No. Sho 60(1985)-26312, this patent having been filed as patent application Sho 52(1977)-75198. This approach has been partially effective in resolving the problem. However, sufficient amounts of debris still reach the optical element. The problem has become aggravated because ever increasing performance and lifetime standards are being established in the operation of lasers.

The inefficiencies in the operation of the apparatus discussed in the previous paragraph are primarily threefold:

1. The gas directed against and past the surface of the optical element such as the window may not be completely clean. This gas is typically passed through a filtering device to remove debris prior to being directed to the surface of the optical element. However, such filtering of debris is often not completely effective in removing the debris. Since the gas is moving along the optical element, it tends to deposit debris on the optical element even as it is attempting to inhibit the migration of debris to the optical element. The rate of deposition of debris on the optical element can therefore actually be increased, rather than inhibited.

2. Filters used to clean the gas may produce gas which is electrically charged. When directed to the surface of the optical element, such charge may be transferred to the surface of the optical element. The charge on the optical element tends to attract and hold undesirable particles such as debris.

3. Some types of filters used to clean the gas may employ hot or cold trapping elements which can elevate or reduce the temperature of the gas being directed to the surface of the optical element such as the window. This difference in temperature can produce a stress in the optical element thereby modifying its optical properties and impeding the operating efficiency of the optical element.

The problems specified above have continued to exist even though they have been long recognized and considerable attempts have been made to overcome these problems.

In one embodiment of the invention, a first gas in a laser cavity is ionized by an electrical discharge in the cavity as a step in producing an energy radiation. Debris (particulated) is produced during the formation of the energy radiation. The energy radiation and the debris move toward an optical element in the cavity. The optical element may be a window or a mirror. The debris tends to deposit everywhere in the cavity, including on the optical element, thereby dirtying the optical element. This inhibits the efficiency in the operation of the laser.

A clean gas is directed into the cavity through a passage at a position displaced from the optical element. The clean gas then passes in the cavity through an orifice further from the optical element than the passage. The flow of the first gas through the orifice creates a venturi effect on the clean gas to insure that the clean gas will move away from the optical element. In this way, the clean gas inhibits the first gas and the debris from moving to the optical element.

Baffles in the cavity between the passage and the orifice provide irregularities in the movement of the first gas from the orifice to the optical element, thereby enhancing the inhibition against the movement of the debris to the optical element. Baffles in the cavity between the passage and the optical element also inhibit the movement of any gas to the optical element. An electrically grounded screen in the displaced passage attracts any ions present in the clean gas.

In the drawings:

FIG. 1 is a schematic diagram showing certain features of a laser well known in the art;

FIG. 2 is a schematic diagram of a system known in the prior art for cleaning an optical element such as a window or mirror in the laser system shown in FIG. 1;

FIG. 3 is a schematic diagram of one embodiment of this invention for cleaning an optical element such as a window or mirror in the laser system shown in FIG. 1; and FIG. 4 is a schematic view of an anode and a cathode and an electrical discharge between the anode and the cathode.

The laser system shown in FIGS. 1 and 4 is well known in the prior art. The system includes a laser discharge housing 10 and optical elements 11 such as mirrors or windows at opposite ends of a cavity in the housing. The optical elements 11 may be windows which pass energy such as light or mirrors which are coated to pass energy partially or fully. When the optical elements 11 constitute windows, mirrors may be disposed outside of the cavity to partially or fully reflect the energy. An electrical discharge 12 is produced between the optical elements 11 by a voltage pulse provided periodically between a cathode 13 and an anode 14 in FIG. 4. The electrical discharge 12 schematically illustrated at 12 in FIGS. 1 and 4 may be produced upon the application of a voltage pulse between an anode 13 and the cathode 14.

A blower 18 may be disposed in the housing 10 to blow suitable gases 17 such as krypton and fluoride in a direction perpendicular to a figurative line between the optical elements 11. The gases 17 are shown as being disposed outside of the area of the electrical discharge 12 but it will be appreciated that the gases may also be disposed in the electrical discharge area. The gases 17 are ionized by the electrical discharge and react chemically to generate radiation at a particular wavelength such as in the excimer range. These gases are heated by this discharge. The heated gases are cooled by a heat exchanger 20 in the housing 10.

Debris is formed by the electrical discharge of the laser in the region 12 and by erosion of the electrodes. The debris may be in the form of particulates. The debris tends to migrate to the optical elements 11 and to cloud the optical elements. One optical element 11 can be considered as a mirror and window if it partially passes the radiation impinging on it and reflects the other portion of the radiation into the cavity.

The features described are disclosed in additional detail in U.S. Pat. No. 4,959,840 issued on Sep. 25, 1990, to Robert P. Akins, Donald G. Larson, Uday K Sengupta and Richard L. Sandstrom for "Compact Excimer Laser Including An Electrode Mounted in Insulating Relationship to Wall of Laser" and assigned of record to the assignee of record of this application. U.S. Pat. No. 4,959,840 should be used in competing any disclosure if there is any problem in this application.

FIG. 2 schematically illustrates a system known in the prior art for inhibiting the debris from moving to one of the optical elements 11. The system includes a shoulder 32 which is disposed in the housing 10 in contiguous relationship to the optical element 11. A finger 34 is disposed inwardly from the shoulder 32 in slightly spaced relationship to the optical element 11 to define a distribution manifold 31 and an orifice 36. Gas passing through a conduit 38 is accordingly forced to move into the manifold 31 and through the orifice 36 and is directed to the surface of the optical element or mirror 11. The gas then moves away from the optical element 11 through a channel 40.

If the gas moving through the conduit 38 were completely clean, the system shown in FIG. 2 and described above might be advantageous. Unfortunately, the gas is never completely clean. Because of this, the system of the prior art is disadvantageous because it actually tends to dirty the optical element 11. This results from the fact that the debris is forced to move against and past the optical element 11. Because of this, some of this debris becomes deposited on the optical element 11.

The system shown in the prior art has another significant disadvantage. When filters are used to clean the gas moving through the orifice 38, the filter may produce an electrical charge in the gas. This charge may be transferred by the gas to the optical element 11, particularly since the gas moves against and past the optical element. The charge on the optical element tends to attract and hold debris. No attempt has been made in the prior art to eliminate such a charge or to prevent the debris from being attracted by such charge when such charge is transferred to the optical element 11.

Since the conduit 38 is relatively close to the optical element 11, the optical element tends to become stressed by the heat generated when the filter is heated or cooled to enhance its ability to trap debris. The filter accordingly heats or cools the gas moving the filter. The heated or cooled gas in turn heats or cools the optical element 11 as the gas moves against or past the optical element 11. The heating or cooling stresses the optical element 11 and distorts the optical properties of the optical element. This reduces the operating efficiency of the optical element 11.

This invention provides a system which overcomes the disadvantages discussed above. This system is shown in FIG. 3. In one embodiment of the invention, apparatus generally indicated at 50 is provided for directing a gas into a channel 52 through a passage 54 which is displaced from an optical element 56 such as a window or mirror and which communicates with the channel. The passage 54 is disposed in a housing 58 which is provided with a shoulder 60 for receiving the optical element 56. The optical element 56 is preferably disposed snugly against the shoulder 60 in the housing 58. A tubular member 61 may be provided at the interior of the housing 58 to define the channel 52.

Baffles 62 are provided in the channel 52. Some of the baffles 62 may be disposed between the passage 54 and an inwardly turned lip 64 which is disposed on the tubular member 61 and which is further displaced from the optical element 56 than the passage 54. The inwardly turned lip 64 defines an orifice 65. Other baffles 68 may be disposed between the passage 54 and the optical element 56. A screen 66 may be extended across the passage 54 and may be electrically grounded. The baffles 62 and 68 and the screen 66 may be supported by the tubular member 61.

Clean gases flow through the passage 54 into the channel 52 and then flow through the channel in a direction away from the optical element 56. The flow of the gases through the channel 52 in a direction away from the optical element 56 is facilitated by the venturi effect created by the flow of the gases with the debris in the electrical discharge area corresponding to the area 12 in FIG. 1. The venturi effect is created because the gases with the debris flow past the orifice 65 in FIG. 3.

Since the passage 54 is displaced from the optical element 56, the gases flowing through the passage 54 do not contact the window. This prevents any dirt or debris in the gases from contacting the optical element 56 and dirtying the optical element. Furthermore, since the gas flow is in a direction away from the optical element 56, it inhibits the movement of any debris or charged particles in the channel 52 from moving to the optical element. As the gases flow through the passage 54, they move past the screen 66. Any charged particles in the gas flow are attracted and removed by the screen 66, particularly since the screen is grounded. The removal of the charged particles inhibits the optical element 56 from becoming charged.

Since the gases flowing through the passage 54 are displaced from the optical element 56, any heating or cooling of the gases does not contact the optical element 56 in the area where light contacts the optical element. This is true even though the screen 66 may be heated or cooled. Because of this, the optical element 56 does not become heated and accordingly does not become stressed. Since the optical element 56 does not become stressed, the optical properties in the optical element are preserved.

The baffles 62 are also instrumental in inhibiting the movement of debris to the optical element 56. The baffles 62 between the passage 54 and the orifice 65 create a turbulence in the gas moving from the passage 54 through the channel 52 and in any gases moving with the debris toward the optical element 56. This turbulence inhibits the movement of the debris to the optical element 56. The baffles 68 between the passage 54 and the optical element 56 also produce a turbulence in the gases flowing from the passage 54 and thereby inhibit the movement of such gases to the optical element 56.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination,
a laser,
a cavity for receiving from the laser energy radiation and debris travelling in a first direction,
an optical element disposed at the end of the cavity for receiving the radiation and debris travelling through the cavity in the first direction,
means for directing gases through the cavity at a position displaced from the optical element and in a direction away from the optical element and opposite to the first direction to inhibit the debris in the cavity from moving to the optical element, and
means disposed in the cavity for enhancing the action of the gases, during the flow of the gases in the cavity in the direction opposite to the first direction, in inhibiting the debris in the cavity from moving in the cavity to the optical element.

2. In combination,
a laser,
a cavity for receiving from the laser energy radiation and debris travelling in a first direction,
an optical element disposed at the end of the cavity for receiving the radiation and debris travelling through the cavity in the first direction,
means for directing gases through the cavity at a position displaced from the optical element and in a direction away from the optical element and opposite to the first direction to inhibit the debris in the cavity from moving to the optical element, and
a baffle in the cavity for providing a turbulence to the gases directed through the cavity in the direction away from the optical element and opposite to the direction of movement of the radiation and debris toward the optical element.

3. In combination,
a laser,
a cavity for receiving radiation from the laser,
an optical element disposed at the end of the cavity for receiving the radiation travelling through the cavity, and
means for directing gases through the cavity at a position displaced from the optical element and in a direction away from the optical element to inhibit any debris in the cavity from moving to the optical element,
a screen disposed in the path of the gases for receiving charged particles in such gases.

4. In a combination as set forth in claim 3 wherein the screen is grounded.

5. In combination,
a laser for providing an electrical discharge in a first direction, the laser containing first gases producing energy radiation at a particular wavelength as a result of the electrical discharge, the electrical discharge producing debris,
means for directing the electrical discharge from the laser in a first direction,
means defining a cavity for containing the electrical discharge,
means at the end of the cavity for receiving the energy radiation after the movement of the energy radiation through the cavity in a second direction transverse to the first direction,
means for providing second gases, and
means for directing the second gases through the cavity at a position displaced from the receiving means and in a direction opposite to the direction of movement of the energy radiation toward the receiving means to inhibit the movement of the debris to the receiving means.

6. In a combination as set forth in claim 5 wherein the directing means for the second gases includes a passage into the cavity and means defining an orifice in the cavity for facilitating the flow of the gases through the cavity in the direction away from the receiving means.

7. In a combination as set forth in claim 6,
means disposed relative to the passage in the cavity for receiving charged particles in the second gases to inhibit the movement of the charged particles to the receiving means.

8. In a combination as set forth in claim 7,
means defining a baffle arrangement in the cavity for enhancing the action of the second gases moving through the cavity in preventing debris from being lodged on the receiving means.

9. In combination,
a housing,
means for providing an electrical discharge in the housing, there being first gases in the housing for ionization and chemical reaction by the electrical discharge to obtain energy radiation, there being debris produced in the housing as a result of the electrical discharge, an optical element in the housing, means displaced from the optical element for directing a passage of second gases away from the optical element from a position displaced from the optical element to inhibit the movement of the debris to the optical element, there being charged particles in such second gases, and means disposed at a position displaced from the optical element for receiving the charged particles in such second gases to prevent such charged particles from reaching the optical element.

10. In a combination as set forth in claim 9, the last mentioned means defining a screen for receiving the charged particles in the second gases.

11. In a combination as set forth in claim 10, the screen being grounded.

12. In a combination as set forth in claim 11, means for producing a turbulence in the second gases during the movement of the second gases away from the optical element to enhance the inhibition provided by the second gases against the movement of the debris to the optical element.

13. In combination, a housing, means disposed in the housing for producing an electrical discharge, there being first gases in the housing for ionization and chemical reaction by the electrical discharge to produce an energy radiation, there being in the housing debris produced by the electrical discharge, optical means disposed at one end of the housing for receiving at least a portion of the energy radiation, and means disposed within the housing and supported by the housing for providing for the flow of second gases through the housing in a direction away from the optical means to inhibit the flow of the debris within the housing toward the optical means.

14. In a combination as set forth in claim 13, means disposed within the housing and supported by the housing for producing a turbulence in the movement of the second gases away from the optical means to inhibit the flow of the debris within the housing toward the optical means.

15. In a combination as set forth in claim 14, the means producing a turbulence in the flow of the second gases away from the optical means including baffles supported by the housing.

16. In a combination as set forth in claim 14, means supported by the housing and disposed within the housing for attracting any charged particles in the second gases before the movement of the second gases away from the optical means.

17. In a combination as set forth in claim 16 wherein the means attracting the charged particles constitutes a screen and wherein the screen is grounded to attract the charged particles.

18. In combination, means for defining a cavity, means for providing an electrical discharge in the cavity, there being gases in the cavity for ionization by the electrical discharge and for chemical reaction to produce energy radiation, there being in the cavity debris produced by the electrical discharge, optical means at one end of the cavity for receiving the energy radiation after the movement of the energy radiation through the cavity, means defining a shoulder for receiving the optical means in a contiguous relationship between the shoulder and the optical means, and means displaced from the shoulder and the optical means for directing second gases through the cavity in a direction away from the optical means to inhibit the movement of the debris to the optical means.

19. In a combination as set forth in claim 18, means defining an orifice in the cavity at a position further displaced from the optical means than the displaced means for receiving the second gases and for passing the second gases through the orifice and for producing a venturi effect on the second gases during the flow of the second gases through the orifice to facilitate the flow of the second gases through the cavity in the direction away from the optical means, the means directing the second gases through the cavity including a passage for directing the second gases into the cavity at a position displaced from the optical means.

20. In a combination as set forth in claim 19 wherein means are disposed in the cavity for attracting any charged particles in the second gases.

21. In a combination as set forth in claim 20 wherein the means attracting the charged particles includes a screen and wherein the screen is grounded to attract the charged particles.

22. In a combination as set forth in claim 21 wherein a baffle is disposed in the cavity between the passage and the orifice to provide a turbulence in the movement of the second gases between the passage and the orifice and thereby inhibit the movement of the debris to the optical means and wherein a baffle is disposed in the cavity between the passage and the optical means to inhibit the movement of the debris and the second gases to the optical means.

23. In a combination as set forth in claim 19 wherein means are disposed in the cavity between the passage and the orifice for providing a turbulence in the movement of the second gases between the passage and the orifice to further inhibit the movement of the debris to the optical means.

24. In a combination as set forth in claim 23 wherein means are disposed between the passage and the optical means for inhibiting the movement of the second gases and the debris to the optical means.

25. A method of preventing an optical element in a laser from being dirtied by debris, including the steps of:

providing for a movement of energy radiation in a particular direction through a cavity toward the optical element, directing gases into the cavity at a position displaced from the optical element, providing for the flow of the gases in the cavity in a direction away from the optical element and opposite to the direction of movement of the energy radiation in the cavity toward the optical element to inhibit any movement of the debris in the cavity to the optical element, and enhancing the action of the gases, during the flow of the gases in the cavity in the direction opposite to the direction of the movement of the energy radiation in the cavity toward the optical element, in inhibiting any movement of the debris to the optical element.

26. A method as set forth in claim 25 wherein the gases are directed into the cavity through a passage and wherein the gases are directed in the cavity through an orifice in the cavity at a position further displaced in the cavity from the optical element than the passage to facilitate the flow of the gases in the cavity in the direction away from the optical element and opposite the direction of movement of the energy radiation in the cavity, the orifice being disposed in the cavity to produce an acceleration in the movement of the gases in the cavity in the direction away from the optical element.

27. A method of preventing an optical element in a laser from being dirtied by debris, including the steps of:

providing for a movement of coherent energy in a particular direction through a cavity toward the optical element, directing gases into the cavity at a position displaced from the optical element, and providing for the flow of the gases in the cavity in a direction away from the optical element to inhibit any movement of the debris to the optical element, and wherein the gases are directed into the cavity through a passage and wherein the gases are directed through an orifice at a position further displaced from the optical element than the passage to facilitate the flow of the gases in the direction away from the optical element, and wherein a screen is disposed in the path of the gases in the cavity to remove any charged particles in the gases and wherein the screen is grounded to attract the charged particles.

28. A method of preventing an optical element in a laser from being dirtied by debris, including the steps of:

providing for a movement of energy radiation in a particular direction through a cavity toward the optical element, directing gases into the cavity at a position displaced from the optical element, and providing for the flow of the gases in the cavity in a direction away from the optical element and opposite the direction of movement of the energy radiation toward the optical element to inhibit any movement of the debris to the optical element, the gases are directed into the cavity through a passage and wherein the gases are directed through an orifice at a position further displaced from the optical element than the passage to facilitate the flow of the gases in the direction away from the optical element and opposite the direction of movement of the energy radiation, a baffle is disposed in the cavity to increase the path of movement of the gases from the passage to the orifice and to inhibit the movement of the debris to the optical element.

29. A method of preventing an optical element in a laser from being dirtied by debris, including the steps of:

providing for a movement of energy radiation toward an optical element in a first direction through a cavity, there being in the cavity debris produced during the production of the energy radiation in the cavity, passing gases through the cavity from a position displaced from the optical element and in a direction away from the optical element and opposite the direction of movement of the energy radiation toward the optical element to inhibit the movement of the debris toward the optical element, and electrically removing debris from the gases just before the passage of the gases into the cavity.

30. A method of preventing an optical element in a laser from being dirtied by debris, including the steps of:

providing for a movement of energy radiation in a first direction through a cavity, there being in the cavity debris produced during the production of the energy radiation in the cavity, passing gases through the cavity from a position displaced from the optical element and in a direction away from the optical element to inhibit the movement of the debris to the optical element, and accelerating the flow of the gases through the cavity during the flow of the gases in the cavity in the direction away from the optical element, after the passage of the gases into the cavity in the direction away from the optical element, to enhance the action in the cavity of inhibiting the movement of the debris to the optical element.

31. A method as set forth in claim 30 wherein the optical element is disposed relative to a passage providing for the movement of the gases into the cavity so as to inhibit the gases from moving in the cavity past the optical element.

32. A method of preventing an optical element in a laser from being dirtied by debris, including the steps of:

providing for a movement of energy radiation in a first direction through a cavity, there being in the cavity debris produced during the production of the energy radiation in the cavity, and passing gases through the cavity from a position displaced from the optical element and in a direction away from the Optical element to inhibit the movement of the debris to the optical element, and wherein an orifice is provided at a position further from the optical element than the passage to produce a venturi effect on the gases for insuring that the gases will move in the cavity in a direction away from the optical element and wherein turbulence is created in the gases between the passage and the orifice to further inhibit the movement of the debris to the optical element.

* * * * *